Oct. 7, 1969 T. B. TERRY Re. 26,682

MEN'S AND BOYS' PANTS

Original Filed Feb. 18, 1964 3 Sheets-Sheet 1

INVENTOR
TRENT B. TERRY,

BY Lawson and Taylor
ATTORNEYS

MEN'S AND BOYS' PANTS
Original Filed Feb. 18, 1964 3 Sheets-Sheet 2
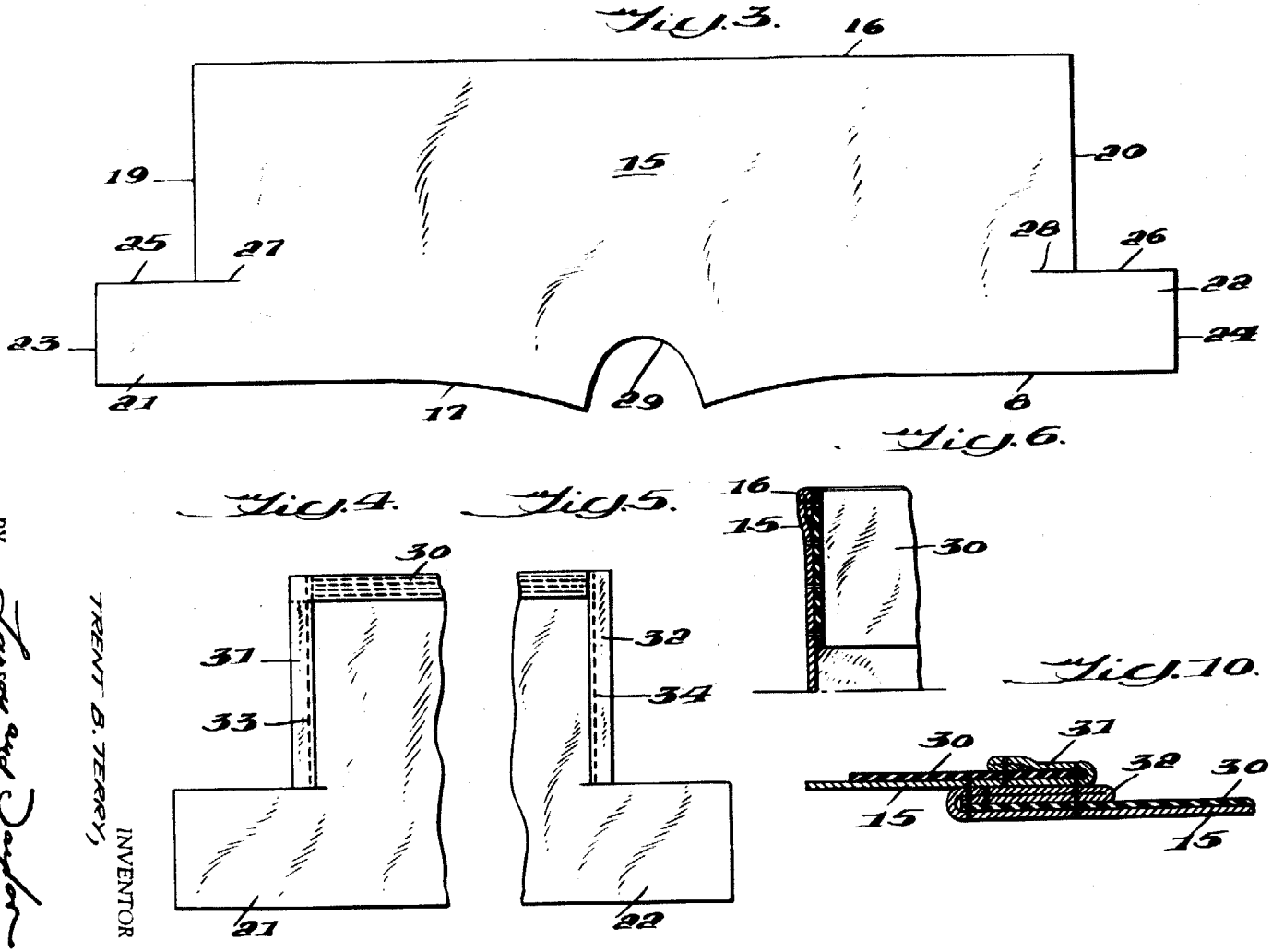
INVENTOR
TRENT B. TERRY,
BY Lawson and Dayton
ATTORNEYS

MEN'S AND BOYS' PANTS

Original Filed Feb. 18, 1964 3 Sheets-Sheet 3

INVENTOR
TRENT B. TERRY,
BY Larson and Taylor
ATTORNEYS

United States Patent Office

Re. 26,682
Reissued Oct. 7, 1969

26,682
MEN'S AND BOYS' PANTS

Trent B. Terry, Charlottesville, Va., assignor of one-half to Haynes L. Settle, Charlottesville, Va.

Original No. 3,226,731, dated Jan. 4, 1966, Ser. No. 345,620, Feb. 18, 1964. Application for reissue Dec. 11, 1967, Ser. No. 694,772
Int. Cl. A41b 9/02
U.S. Cl. 2—224 5 Claims

Matter enclosed in heavy brackets [ ] appears in the original patent but forms no part of this reissue specification; matter printed in italics indicates the additions made by reissue.

*ABSTRACT OF THE DISCLOSURE*

*A one-piece blank for men's and boys' pants including a main body portion with generally straight top and bottom edges and parallel lateral fly edges perpendicular to the top edge and approximately one fifth the length of the top edge, a pair of crotch edges extending laterally outwardly from the body portion and inseam edges generally parallel to the fly edges. The blank is assemblied by connecting the fly edges to each other to form the fly, the top crotch edges together to form the crotch and the inseam edges together to form the inseam.*

This invention relates to clothing, and more particularly, men's and boys' *pants such as* boxer-type shorts.

Manufacturers in the past have been attempting to reduce costs of production without affecting the quality, comfort and attractiveness of men's and boys' *pants such as* boxer-type undershorts. Further efforts have been made at forming such [shorts] *pants* from single piece blanks, but these past efforts have not produced a long wearing and comfortable garment.

One of the many problems relating to the construction of [undershorts] *pants* for men and boys lies in the crotch and inseam construction. Boxer-type undershorts, *for example,* normally wear first in these areas, and often, tearing occurs after a relatively short garment life.

My present invention results in a garment which overcomes the many primary disadvantages of existing *pants such as* boxer-type undershorts, asd yet my resulting garment is long wearing, attractive and comfortable. More importantly, cost of construction is extremely low, in that a minimum of cutting and sewing is needed. Similarly, the resulting pair of undershorts has a fullness in the areas where needed, without producing an undesirable "bagging" effect in the other garment areas.

[My present invention results in a garment which overcomes the many primary disadvantages of existing boxer-type undershorts, and yet my resulting garment is long wearing, attractive and comfortable. More importantly, cost of construction is extremely low, in that a minimum of cutting and sewing is needed. Similarly, the resulting pair of undershorts has a fullness in the areas where needed, without producing an undesirable "bagging" effect in the other garment areas.]

A primary object of my invention, therefore, resides in the provision of a pair of long wearing boxer-type undershorts for men and boys, which undershorts have an improved construction with minimum cost of manufacture.

Another object resides in the provision of a pair of undershorts having a pleasing appearance and comfortable wearing properties.

Yet a further object resides in the production of a pair of undershorts in which the crotch and inseam leg portions are modified in order to minimize wearing and tearing in these areas, and without producing a consequent oversize or "bagging" in other areas.

Still another object resides in the provision of a method of manufacturing boxer-type undershorts from a single piece blank with a radical savings in yardage and a reduction in the number of steps and amount of skill required for construction.

These and other objects and advantages of the present invention will become more apparent from the following description, the accompanying drawing forming a part thereof, and in which:

FIGURE 3 is a plan of the single blank required for construction of the undershorts, taken on the reverse of the material;

FIGURE 4 is a detail of the initial formation of the inner fly portion on the reverse of the material;

FIGURE 5 is a corresponding detail of the initial formation of the outer fly portion;

FIGURE 6 is a section of the waist band portion, taken on line 6—6 of FIGURE 8;

FIGURE 10 is a section of the upper fly portion taken on line 10—10 of FIGURE 8.

Figure 1:
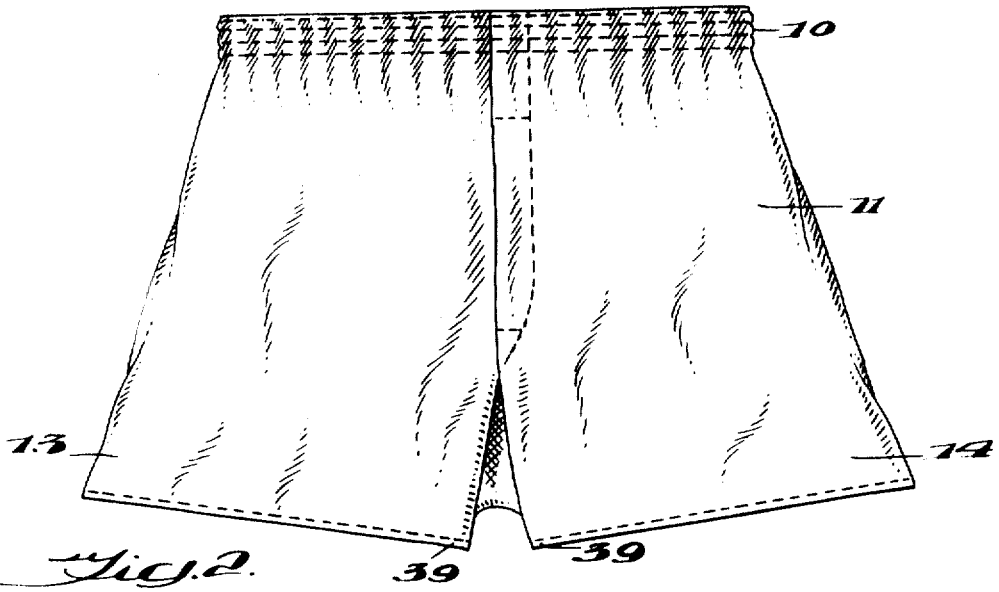
FIGURE 1 is a front view of a preferred embodiment of my invention showing a completed pair of men's or boys' boxer-type undershorts.
Figure 2:
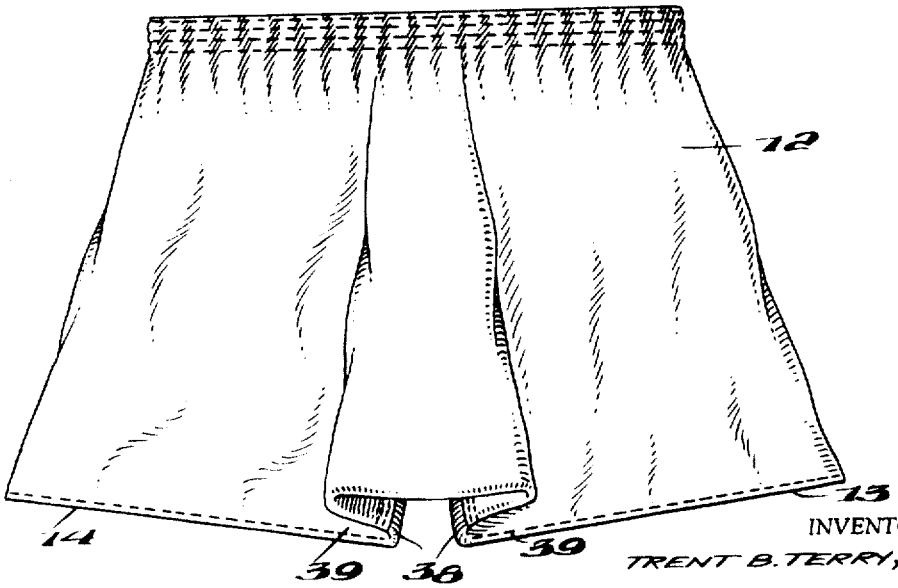
FIGURE 2 is a rear view of the completed pair of undershorts.
Figure 8:
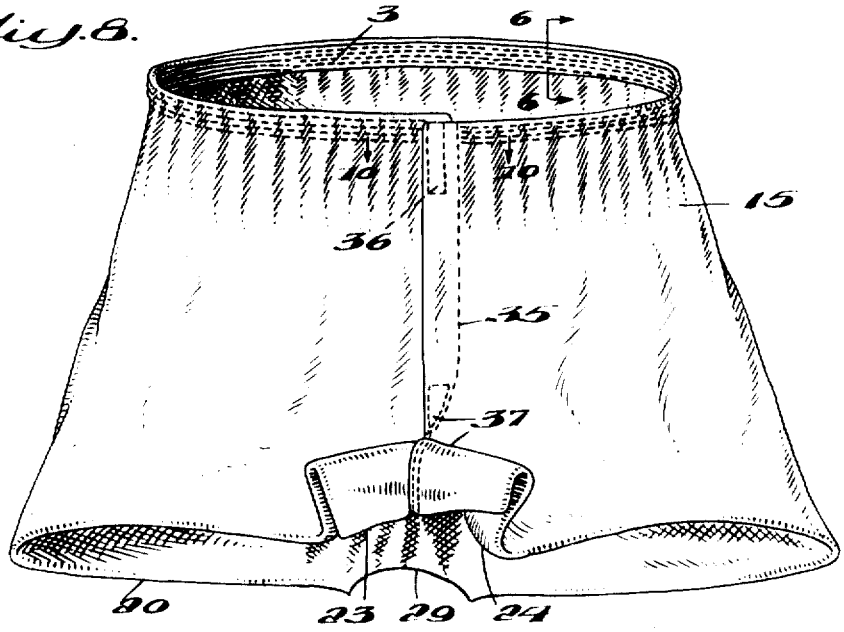
FIGURE 8 is a view indicating the sewing required for joining the lower fly portion and the crotch.

A pair of men's boxer-type undershorts, as generally shown by FIGURES 1 and 2, is normally constructed of woven or unribbed knitted material and comprises a waist portion 10, a front portion 11, a seat and back portion 12, and leg portions 13, 14. As is readily apparent, and because the undershorts are made from a single piece blank, there are no seams except at the waist, the fly, the crotch, and the leg portions.

FIGURE 3 discloses the single blank necessary for the construction of the undershorts according to my invention. The blank 15 includes a main body portion having a straight top waist edge 16 cut on the straight of the material and partial side fly edges 19, 20, also on the straight of the material, which side fly edges are parallel to each other and perpendicular to the top waist edge 16. In combination with the main body portion, the single blank also includes crotch portions 21 and 22. Crotch portions 21, 22 are formed of additional material extending laterally of the main blank portion and include vertical inseam edges 23, 24, and horizontal crotch edges 25, 26. Edges 23, 24 are parallel to the fly edges 19, 20, whereas the crotch edges 25 and 26 are perpendicular to both. As can be seen, the respective bottom edges 17, 18 extend continuously through the crotch portions 21, 22 and curve downwardly and inwardly to a bottom center edge 29 having a concave outline equal in length to the sum of the lengths of edges 23, 24. In addition, the blank 15 is formed with two slits or cuts 27, 28 extending inwardly of the respective crotch portions 21, 22, the slits forming straight continuations of the respective crotch edges 25, 26.

In order to achieve the long wearing and comfortable qualities of the present invention, the crotch portions 21, 22 are formed such that the crotch edges 25, 26 each have a length about one-tenth the length of the top waist edge 16, whereas inseam edges 23, 24 have a length of slightly over one-half the length of the respective fly edges 19, 20 (55 to 60 percent). The bottom edges 17 and 18 are straight and parallel to the top waist edge 16 except at the portion in the center corresponding in length to about one-third of the length of the top waist edge 16. At this center portion, the bottom edges 17, 18 taper downwardly to a point at which the overall height of the blank 15 is increased by about 10 percent. The two formed points are spaced from each other at a distance of about one-eighth the length of the waist edge 16, and the concave edge 29 is symmetrically formed to have a length equal to the sum of the lengths of edges 23, 24. The cuts 27, 28 each have a length of about 4 percent the length of the top waist edge 16. For example, for a pair of size 36 men's undershorts, the top edge 16 has a length of 52 inches, the corresponding cuts 27, 28 each have a length of about 2 inches, and the edges 25, 26 extend outwardly from the fly edges 19, 20 at a length of about 5 inches. The height of the blank 15 except at the center portion is about 18 inches, whereas the respective edges 23, 24 comprise 6½ inches of this length.

After the blank 15 has been cut and the slits 27, 28 made, the convenient first step of fabrication is to apply an elastic waist band 30 along the top edge portion 16. The waist band 30 is stitched to the material in a known manner with four lines of stitching as shown in FIGURE 6, and it is of course stretched to a predetermined extent while applying in order to enable the material at the waist portion 10 to gather to the desired waist measurement. For reasons hereinafter discussed, the waist band 30 is started at a distance inwardly of the fly edge 19, the distance being equal to about one-half the depth of the cut 27, whereas the waist band 30 is terminated at a distance from the lateral edge 20 equal in length to the cut 28.

Therefore, it should be observed that the band 30 requires only a single unhampered sewing operation in that the band need not be curved and the sewing threads at the ends need not be trimmed and reinforced. This will become more apparent as the construction continues.

As shown in FIGURE 4, the inner fly portion is prepared by folding over the edge 19 to a point about one-half the depth of the slit 32 (the edge of belt 30) and the extreme edge thereof is then hemmed by turning inwardly. The resulting fold is then sewn with a single line of stitching 33 along the entire length thereof. The outer fly portion, shown in FIGURE 5, is initially formed in the same manner, namely that the edge 20 is first folded at a point about one-half the depth of the slit 28, and the extreme edge 20 is turned under for hemming and sewn along a line of stitching 34. The corresponding end of the band 30 abuts the hem fold.

Figure 7:
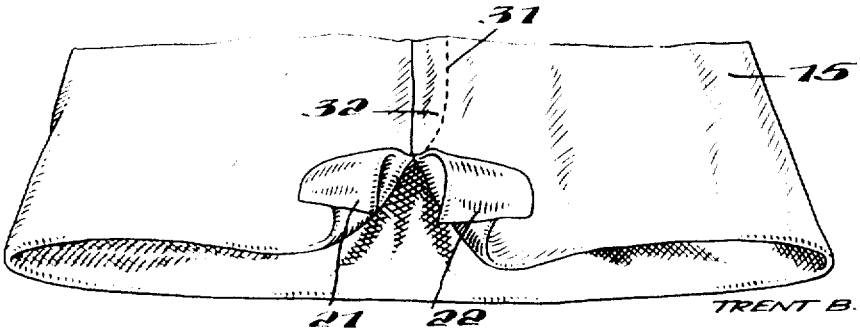
FIGURE 7 is a view showing the overlay of the inner and outer fly portions and the initial joining thereof.

As the initial formation of fly end portions 31 and 32 have been completed, they are then brought together in the manner shown in FIGURE 7. In this operation, the outer edge portion 32 is again folded inwardly at the innermost edge of the slit 28 and the inner points of the respective slits 27 and 28 are placed in contiguous relation to each other. The result is a corresponding overlap of the inner fly end 31 and the doubled over outer fly end 32. See FIGURE 10. The extreme lower edges of the fly end portions 31, 32 are then tucked inwardly to form a triangular section, and the outer fly portion 32 is then sewn along the single line of stitching 35 down its entire length to the bottom to retain the tuck.

At the top, a single needle stitch 36 is performed with a resultant rectangular pattern to retain the waistband together while enabling the lower portion of the fly to remain open.

Figure 9:
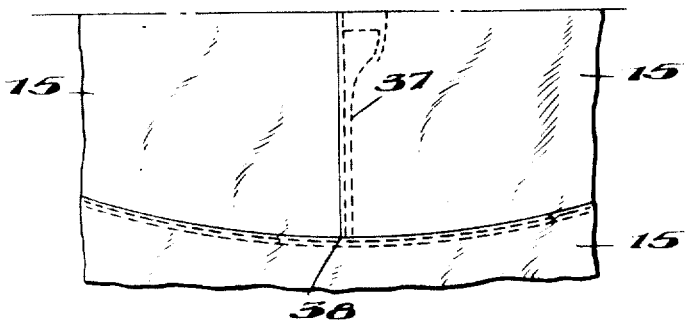
FIGURE 9 is a detail of the inseam portion after sewing.

As shown in FIGURE 9, the crotch edge portions 25 and 26 are appropriately hemmed as for a usual narrow width double needle operation along stitch line 37. The stitch line 37 is formed by a single needle in which the parts are stitched together by starting at the crotch end, sewing up the crotch and a short distance along the fly and across the fly and back down the crotch end, thereby forming the triangular pattern around the tuck as shown.

The next step in the manufacture of the garment comprises the formation of the legs by sewing of the inseam 38. This is done by stitching the edges 23, 24, now in contiguous relation, to the concave bottom edge 29. This is done in one continuous double needle operation as shown partially in FIGURE 9 and partially in FIGURE 2. The garment may then be completed by hemming the leg openings with stitching 39, as shown in FIGURE 1, to form the finished leg portions 13 and 14.

As an improvement, a narrow-width reinforcing binding can be added to the crotch portion by sewing on a short section thereof after the initial fly portions are made as shown in FIGURES 4 and 5. This is accomplished by laying a narrow-width reinforcement strip along the bottom edge of the fly end portion 31 at the upper edge of the slit 27 to its inner end, and then reversing the strip along the lower edge of the slit and a short length of the edge 25. The strip is then sewn to the respective sides of the slit 27 and a corresponding operation is done at the slit 28. The result, when seen with respect to FIGURE 7, will show that the reinforcing binding is straightened because of the manner in sewing the portions 21 and 22 together, and ripping of the material at this point can be prevented by the binding.

In practice, a substantial savings in material is accomplished, because of the simplicity of the blank formation and the minimum of cutting required. For example, in a normal size range of 30 to 44 for men's undershorts, 9½ yards of standard width cloth can be used to make a dozen pair of shorts.

Yet notwithstanding the savings of material, comfort and simplicity are retained. The crotch and leg areas are increased substantially in size and roominess to enable a freer movement and reduction in wearing, without a consequent excess of material above these portions. Thus, a relatively tight relationship is maintained about the waist, since walking and normal exercising does not require an excess of material around the upper waist to permit free movement. Yet running, stretching and bending is readily permitted, because of the increased size in the leg portions and the crotch area. A slimming effect is retained, because there is not an excessive bunching of material at the waist.

It is of course to be understood that the form of my invention, shown herewith and described, is a preferred embodiment, and that some changes in shape, size and method of manufacture can be resorted to without departing from the spirit of the invention or the scope of the subjoint claims.

I claim:

1. Blank means for a pair of men's or boys' boxer type undershorts comprising a single piece blank having a main body portion with a substantially straight top waist edge and two parallel lateral fly edges extending substantially perpendicular to the top edge and being less than ⅔ the height of the blank, and a pair of crotch portions extending laterally outwardly from the lateral edge portions of the body portion a distance approximately 1/10 of the length of the top waist edge, and having a top crotch edge parallel to the top waist edge and a lateral inseam edge parallel to the respective fly edges, the length of the inseam edge being approximately ½ of the length of the fly edge, and the blank further having a bottom edge in which the center portion is upwardly concave and the remaining portions of the bottom edge are substantially parallel to the top waist edge, the length of the concave center portion being substantially twice the length of the lateral inseam edge of the crotch portion.

2. Blank means according to claim 1, and further including slits at each of the junctures of the respective lateral fly edges and top crotch edges of the crotch portions, each slit forming a straight continuation of the top crotch edge to define an extended crotch edge seamline below the cut and a lower fly edge portion above the cut.

3. A pair of men's or boys' undershorts comprising a single blank of material having a main body portion with a substantially straight top waist edge and two parallel lateral fly edges extending substantially perpendicular to the top edge and being less than ⅔ the height of the blank, and a pair of crotch portions extending laterally outwardly from the lateral edge portions of the body portion a distance approximately 1/10 of the length of the top waist edge and having a top crotch edge parallel to the top waist edge and a lateral inseam edge parallel to the respective fly edges, the length of the inseam edge being approximately ½ of the length of the fly edge, and the blank further having a bottom edge in which the center portion is upwardly concave and the remaining portions of the bottom edge are substantially parallel to the top waist edge, the length of the concave center portion being substantially twice the length of the lateral inseam edge of the crotch portion, the top crotch edges being joined together to form a crotch, the inseam edges of the crotch portion being sewn to the center concave portion of the bottom edge of the main body portion to form inseams and crotch and leg portions and the ends of the top waist edge being secured together to form a waist.

*4. Blank means for a pair of men's or boys' pants comprising a single piece blank having a main body portion with a generally straight top waist edge and two parallel lateral fly edges extending substantially perpendicular to the top waist edge and being approximately 1/5 of the length of the top waist edge, and a pair of crotch portions extending laterally outwardly from each lateral edge portion of the body portion, each said crotch portion having a top crotch edge parallel to the top waist edge and extending outwardly from its respective lateral fly edge to a point where it forms an approximately right angle with a lateral inseam edge, each said lateral inseam edge being generally parallel to its respective fly edge, the length of the two said inseam edges being substantially equal to each other, and the blank further having a bottom edge in which the center portion is upwardly concave and the remaining portions of the bottom edge are substantially parallel to the top waist edge, the length of the concave center portion being substantially twice the length of a lateral inseam edge of a crotch portion.*

*5. Blank means for a pair of men's or boys' pants as claimed in claim 4 wherein the said top crotch edge extends outwardly from said lateral fly edge a distance approximately 1/10 the length of the top waist edge.*

References Cited

The following references, cited by the Examiner, are of record in the patented file of this patent or the original patent.

UNITED STATES PATENTS

| | | | |
|---|---|---|---|
| 1,462,564 | 7/1923 | Weiner | 2—224 |
| 2,169,492 | 8/1939 | Goldfarb | 2—225 |
| 2,348,242 | 5/1944 | Bullinger | 2—224 |
| 2,710,410 | 6/1955 | Gray | 2—234 |
| 2,843,852 | 7/1958 | Stone | 2—225 |
| 2,896,219 | 7/1959 | Clyne | 2—224 |
| 3,134,108 | 5/1964 | Terry et al. | 2—224 |
| 2,056,639 | 10/1936 | Wipperman | 2—224 X |
| 2,176,826 | 10/1939 | Terry | 2—224 |

FOREIGN PATENTS

| | | |
|---|---|---|
| 551,487 | 1/1958 | Canada. |
| 609,711 | 9/1960 | Italy. |

H. HAMPTON HUNTER, Primary Examiner